US005737901A

United States Patent [19]
De Greef

[11] Patent Number: 5,737,901
[45] Date of Patent: Apr. 14, 1998

[54] METHOD AND APPARATUS FOR PACKAGING AGRICULTURAL AND HORTICULTURAL PRODUCE

[75] Inventor: Jacob Hendrik De Greef, Waardenburg, Netherlands

[73] Assignee: de Greef's Wagen-, Carrosserie-en Machinebouw, B.V., Tricht, Netherlands

[21] Appl. No.: 601,959

[22] Filed: Feb. 15, 1996

[30] Foreign Application Priority Data

Feb. 16, 1995 [NL] Netherlands ................ 9500296

[51] Int. Cl.$^6$ ................................................ B65B 35/56
[52] U.S. Cl. ................................ 53/446; 53/544; 53/52
[58] Field of Search ........................... 53/52, 55, 244, 53/247, 142, 446, 475, 539, 544, 494, 495, 498, 499, 503, 504; 209/580, 587, 538, 939; 382/110, 141; 356/388, 394, 398, 408, 426, 427

[56] References Cited

U.S. PATENT DOCUMENTS

| | | | |
|---|---|---|---|
| 3,183,640 | 5/1965 | Gee et al. | 53/498 |
| 4,687,107 | 8/1987 | Brown et al. | 209/939 X |
| 4,693,378 | 9/1987 | Azegami et al. | 209/939 X |
| 4,726,898 | 2/1988 | Mills et al. | 209/939 X |
| 4,800,704 | 1/1989 | Ishii et al. | 53/544 X |
| 4,940,536 | 7/1990 | Cowlin et al. | 209/939 X |
| 5,040,056 | 8/1991 | Sager et al. | |
| 5,085,325 | 2/1992 | Jones et al. | 209/939 X |
| 5,165,219 | 11/1992 | Sekiguchi et al. | |
| 5,244,100 | 9/1993 | Regier et al. | 209/939 X |
| 5,339,607 | 8/1994 | Regier | 53/475 X |
| 5,339,963 | 8/1994 | Tao | 209/939 X |
| 5,345,748 | 9/1994 | Powell | 53/475 X |

FOREIGN PATENT DOCUMENTS

| | | | |
|---|---|---|---|
| 0056790 | 7/1982 | European Pat. Off. | |
| 0062007 | 10/1982 | European Pat. Off. | |
| 0436244 | 7/1991 | European Pat. Off. | |
| 554954 | 8/1993 | European Pat. Off. | 209/939 |
| 9104803 | 4/1991 | WIPO | 209/939 |

Primary Examiner—Daniel Moon

[57] ABSTRACT

The packaging of agricultural or horticultural produce requires much manual work, particularly when the stalks of fruits such as apples are all made to point in the same direction and/or when the most attractively colored side is properly presented. The invention relates to and provides a method which can be performed automatically wherein at least one camera recorded images of products are made and the products are packed subject to the recorded images.

14 Claims, 6 Drawing Sheets

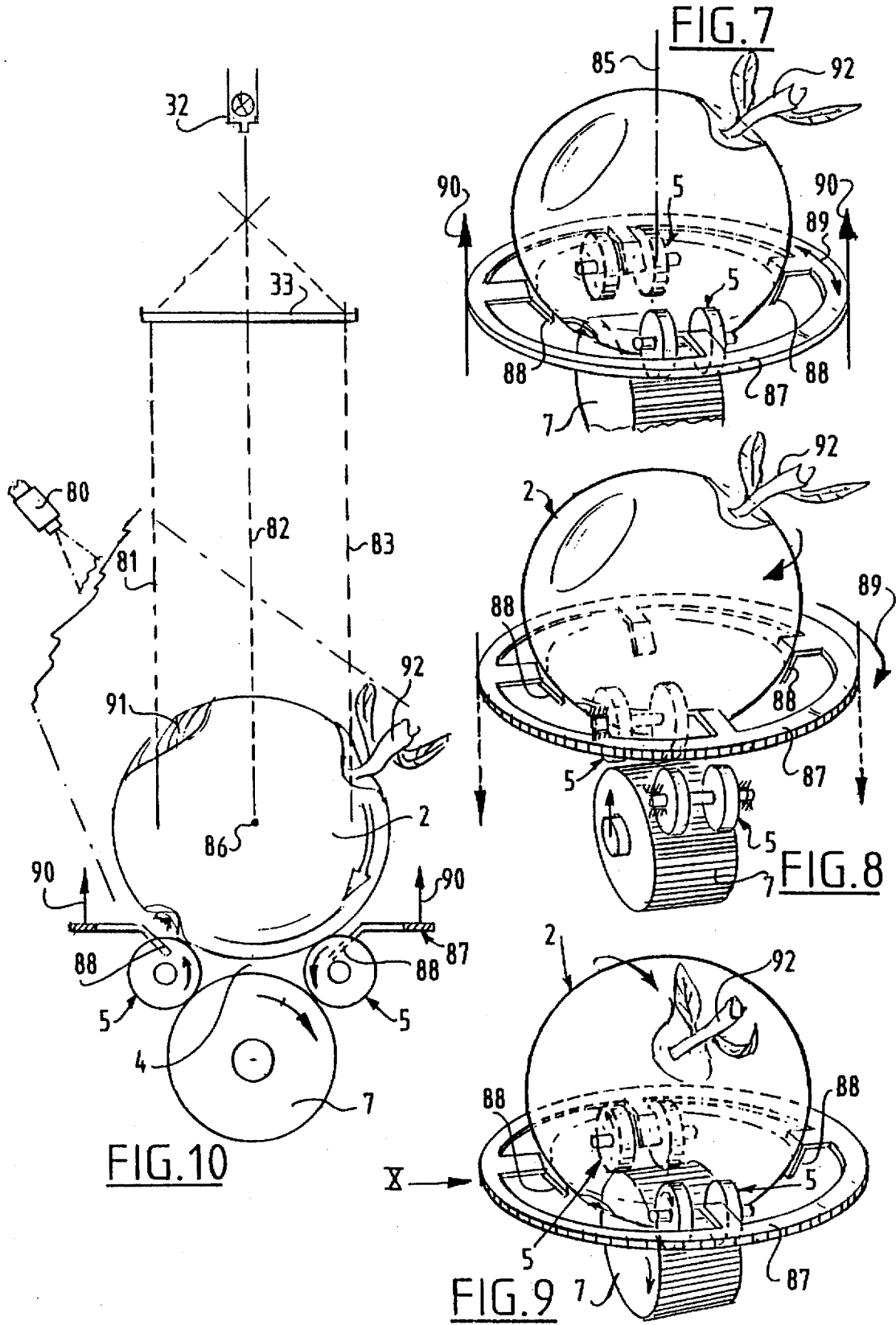

METHOD AND APPARATUS FOR PACKAGING AGRICULTURAL AND HORTICULTURAL PRODUCE

BACKGROUND OF THE INVENTION

The packaging of agricultural or horticultural produce requires much manual work, particularly when the stalks of fruits such as apples are all made to point in the same direction and/or when the most attractively coloured side is properly presented.

SUMMARY OF THE INVENTION

The invention relates to and provides a method and apparatus for packaging agricultural and horticultural produce according to the invention which can be performed automatically wherein at least one camera recorded image of the product is made and the produce is packed subject to the recorded image.

BRIEF DESCRIPTION OF THE DRAWINGS

The invention will be elucidated in the description hereinbelow with reference to drawings, in which:

FIG. 10 shows a view according to arrow X in FIG. 9.

DESCRIPTION OF THE PREFERRED EMBODIMENT

Figure 1:
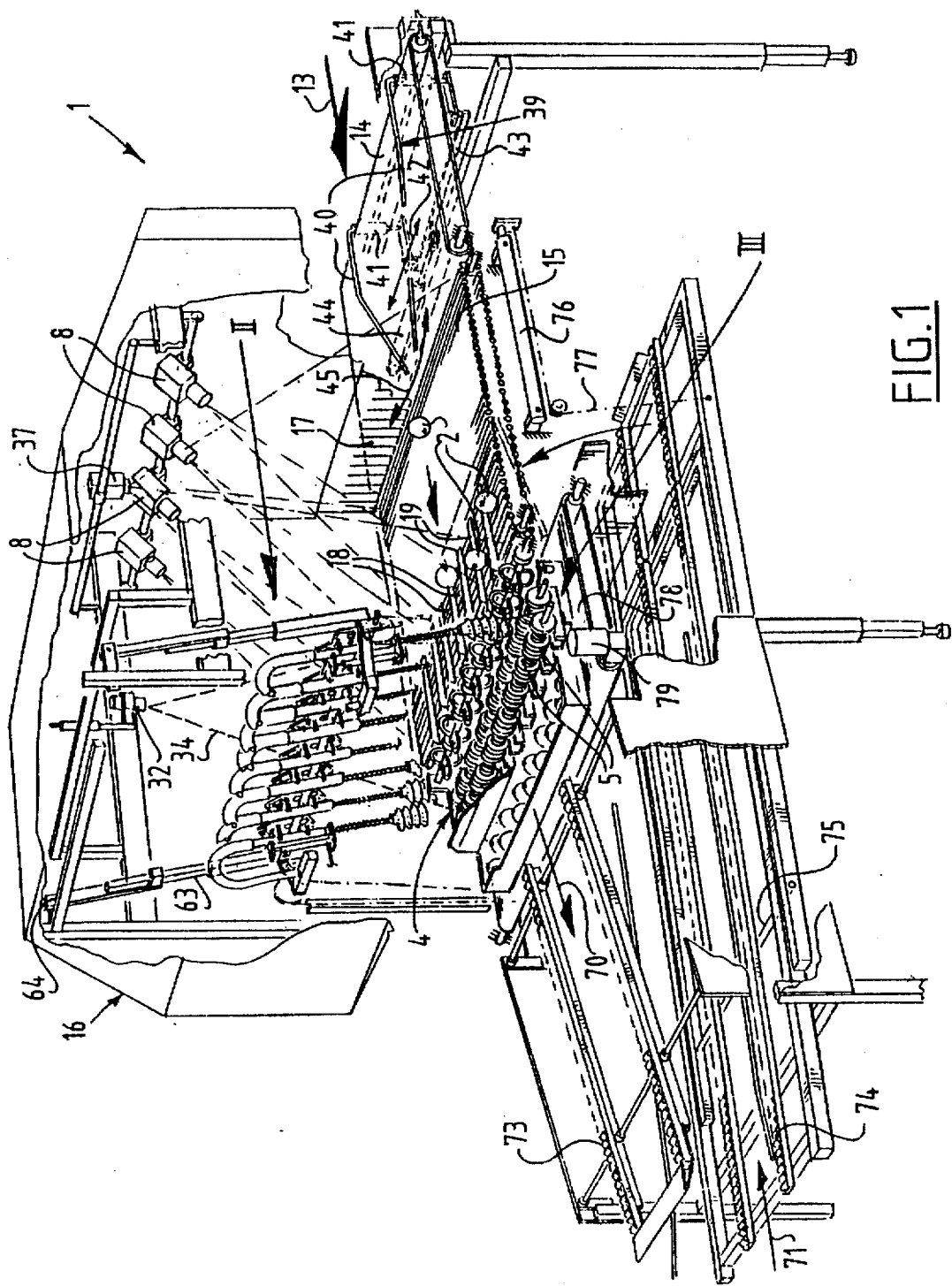
FIG. 1 shows a perspective view of a preferred embodiment of an apparatus according to the invention.
Figure 2:
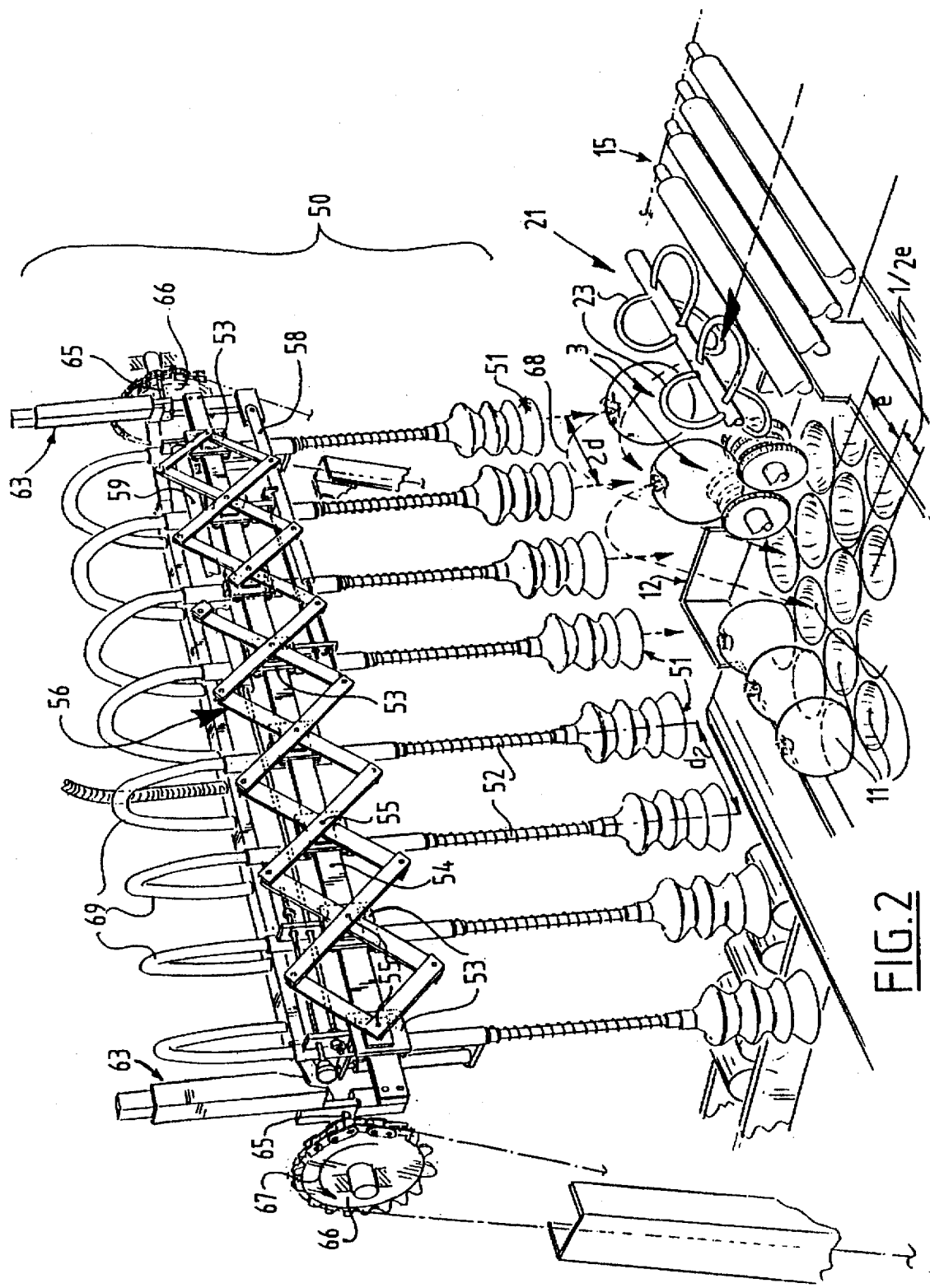
FIG. 2 shows on larger scale detail II of FIG. 1.
Figure 3:
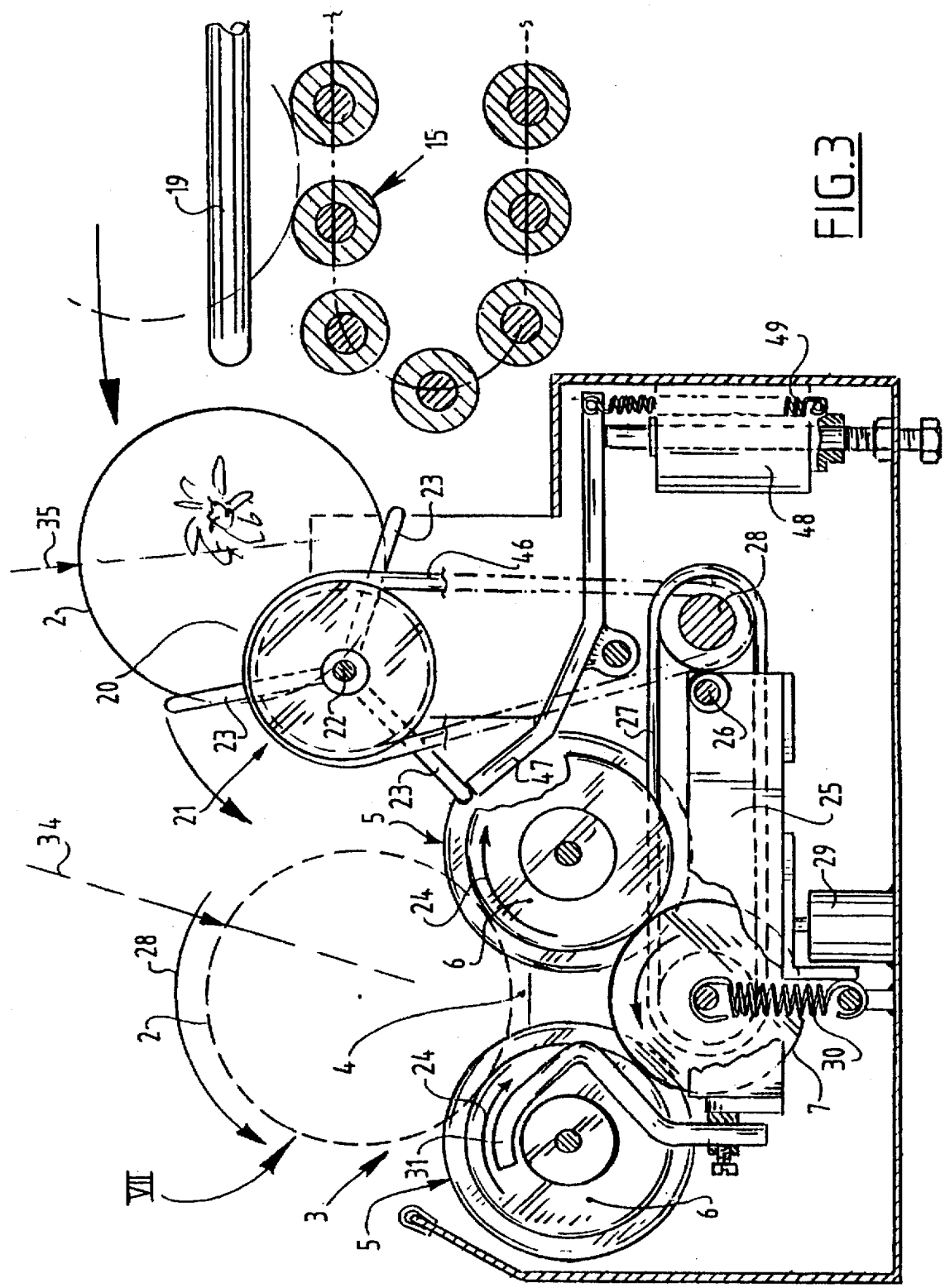
FIG. 3 shows on larger scale a section of detail III of FIG. 1 taken in the transporting direction.
Figure 4:
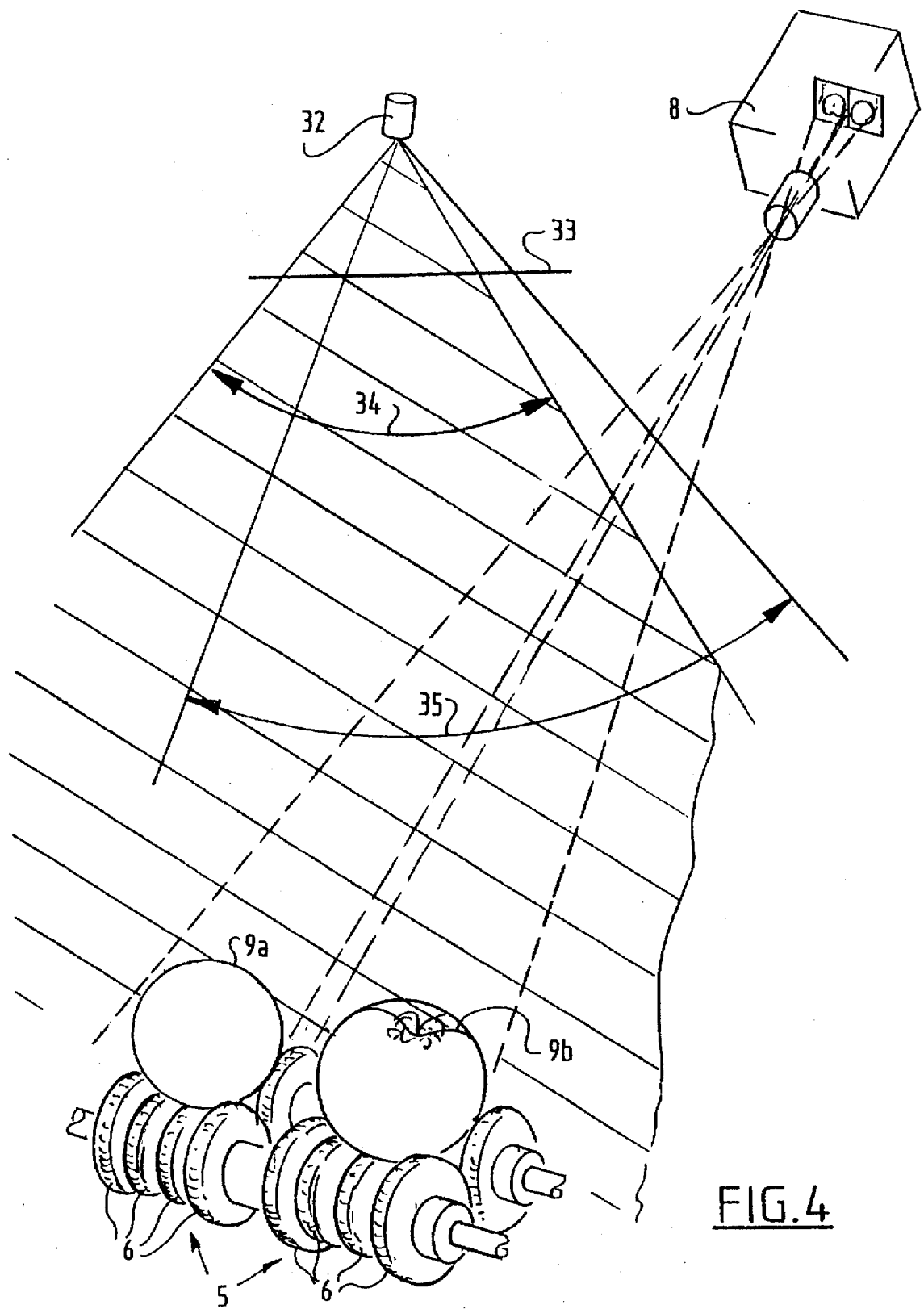
FIG. 4 is a perspective view of the means for making camera recordings of tomatoes.

In FIG. 1 agricultural or horticultural products (designated hereinafter as products 2), for instance tomatoes, are fed as according to arrow 13 to the apparatus 1 for packaging the products 2. Products 2 arrive via a conveyor belt 14 and are delivered to a conveyor belt 15 which is situated in a housing 16 that is closed to outside light. The entrance to housing 16 contains a flexible light screen 17. In housing 16 the products 2 are transported to waiting lanes 18 which are mutually separated by strips 19. Each waiting lane 18 debouches into a receiving location 20 (FIG. 3) where a product 2 is picked up by a tilting device 21. This consists of a tilting shaft 22 which for each receiving location 20 has three receiving bases 23 formed by brackets and distributed over the periphery.

When the tilting shaft 22 is tilted through 120° products 2 lying on receiving bases 23 come to lie in an aligning device 3. At each aligning location 4 for a product 2 this comprises a pair of rollers 5 which are each adapted to the round shape of products 2 and which have annular grooves 6. Each pair of rollers 5 is drivable in arrow direction 24 by means of an associated drive roller 7 which is supported by an arm 25 which is pivotable on a pivot shaft 26 and which is driven continuously via an endless belt 27 from a continuously driven drive shaft 28.

A product 2 can be rotated at an aligning location 4 as according to arrow 28' until it is situated in the selected position, i.e. as long as the rubber drive roller 7 makes contact with rollers 5, wherein an energized magnet coil 29 presses arm 25 upward. As soon as the product 2 is situated in the selected position, the energizing is stopped and a draw spring 30 pulls drive roller 7 downward, wherein spring-mounted fingers 31 reaching into grooves 6 also brake at least one of the rollers 5, whereby the rotation of product 2 is stopped immediately.

Figure 5:
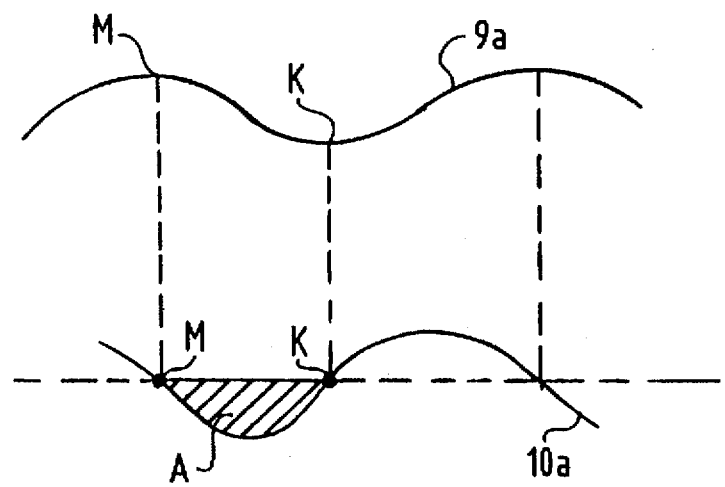
FIGS. 5 and 6 show two examples of a recorded image made by a camera of the same tomato situated in two different positions, FIGS. 7, 8 and 9 each show a perspective view of a variant of detail VII of FIG. 3, each in a different situation in the case of an apple.

The control of the rotation of each pair of rollers 5 takes place in each case subject to recordings by a camera. Laser light from a laser lamp 32 is shone onto products 2 at aligning locations 4 via a screen with a transverse slit such that the laser light falls onto product 2 in a light plane 34. Cameras 8 make of each product 2 situated at a determined aligning location 4 a recorded image 9a (FIG. 5) or 9b (FIG. 6) which is electronically converted in a known electronic manner into a computably processable curve 10a, 10b respectively. The recorded image 9a is stored as coordinates and the derived function of recorded image 9a is determined. This is the curve 10a. The first local maximum M is detected. The derivative at M is 0. The subsequent local maximum K is detected where the derivative is also 0. In the case of a tomato the recorded image passes through the tomato crown when the surface A enclosed by curve 10a and the axis MK is greater than a preset value.

Figure 6:
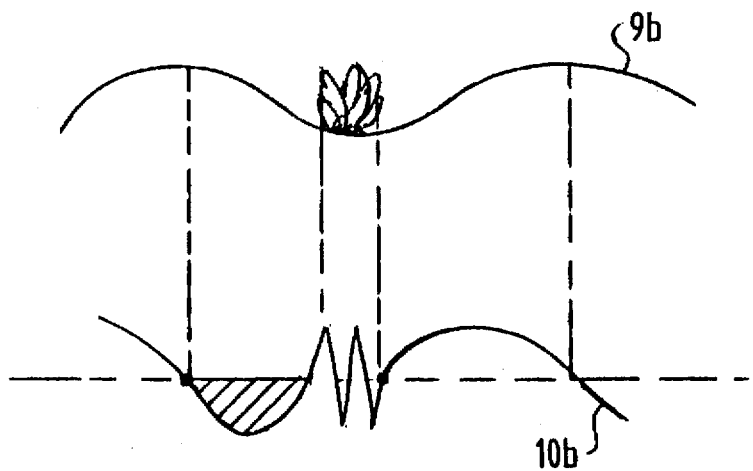

Related to a selected position of the product, for instance of FIG. 6 (crown upward), is a recorded image 9b which has an associated computable curve 10b which is readily identifiable as substantially corresponding with the computable curve of the selected position of the product. The margins of variation in the computable curve can be adjusted such that rotation of rollers 5 is ended as soon as the recorded image meets requirements, i.e. falls within the set margin. Each camera 8 preferably makes a simultaneous recorded image of two products 2, although each part of the recorded image (per product) is computably processed separately and separately compared with a reference image 9b (i.e. with a computable curve 10b) of the desired product position.

The screen of laser lamp 32 preferably allows through a second light plane 35 which falls onto the products 2 situated at the receiving locations 20. A camera 37 makes a recorded image of all receiving locations 20 simultaneously. By comparing this recorded image with a reference image which is the recorded image of a situation in which all receiving locations 20 are filled with a product 2, the computer provides information relating to these receiving locations 20 which may still be empty. Alternatively, the image of a roller conveyor can be used as the information that no fruit is present there.

Guide means 39 for distributing products 2 over the waiting area 18 are controlled subject to this information. These guide means 39 comprise, for instance, two pivot arms 40 which are mounted in bearings 42 and which are displaced jointly in arrow directions 42 by means of an air cylinder 44 driving the transverse rod 43. During operation the pivot arms 40 continuously pivot reciprocally as according to arrows 45, although this movement is adapted if necessary to fill a possibly empty receiving location 20 and associated waiting area as quickly as possible.

As soon as it is determined that the aligning locations 4 are empty, the tilting device 21 of only the filled receiving locations 20 is tilted in that it is driven rotatably through 120° by means of a belt 46 from the shaft 28 via a temporarily energized friction coupling (not drawn). Prior to this tilting movement a pivoting finger 47 which holds back a receiving base 23 is driven just outside the path of this receiving base 23 by means of a magnet coil 48 and during the tilting of tilting device 21 a draw spring 49 pulls this finger 47 back into the path of the following receiving base 23.

As soon as each previously unfilled receiving location 20 receives a product 2 the associated tilting device 21 tilts this product 2 into an aligning location 4.

As soon as alignment at all aligning locations 4 is completed, the products aligned at aligning locations 4 are transferred to a row of packaging positions 11 in a box 12 by means of transferring means 50 comprising a series of suction cups 51 suspended via rods 52 on carriers 53. These are guided slidably along a transverse rod 54 and each support a central hinge 55 of a Neurenberg link system 56. The mutual pitch distance d of suction cups 51, which is equal to the pitch distance d of aligning locations 3, can be adjusted by means of the link system 56 to the pitch distance e of the packaging positions 11 by means of a fluid cylinder 59 which operates between the two outermost carriers 53. Since the packaging positions 11 in successive rows are staggered in each case by a distance of ½ e, the whole link system is displaced through a distance of ½ e at each second transfer by means of a fluid cylinder 58 operating between the rod 54 and one of the carriers 53. Rod 54 is pivotally suspended from housing 16 at hinges 64 by means of telescopic rods 63, a drive pin 65 of which is fixed to the periphery of a driving disc 66 which is moved in each case in an arc 67, wherein the suction cups 51 then make an arcuate movement 68 so that products 2 are transferred from aligning locations 4 to packaging positions wherein a vacuum is created in the suction cups 51 via hoses 69 and wherein the pitch distances d of the suction cups are changed to e and if necessary undergo the sideward displacement of ½ e. After setting down products 2 by releasing the vacuum in suction cups 51 these latter are removed from the packaging positions 11 and later carried to the aligning locations 4 as soon as the following aligning operation is completed. The box 12 is meanwhile shifted the distance of a row in a known manner and the filled box 12 leaves the packing apparatus 1 as according to arrow 70 over a roller conveyor 73. Empty boxes 72 enter as according to arrow 71 over a roller conveyor 74 which is pivotable on a horizontal shaft 75 and which can be lifted by means of a fluid cylinder 76 and a cable 77 to carry the box 12 fed on roller conveyor 74 up onto the conveyor belt 78 which is driven by means of an electric stepping motor 79 after each transfer movement of the transferring means 50.

In the case of apples and other fruits it may be desired to present the most attractive side, for instance the bloom side. A colour camera 80 (FIG. 10) is then present for this purpose, while light from a light source 84 is shone onto product 2 lying at an aligning location 4 via a screen in three transverse planes 81, 82, 83. Rollers 5 are driven in order to rotate product 2 on the transverse axis 86. In order to rotate product 2 on a vertical axis 85 product 2 is lifted from the rollers 5 according to arrows 90 by means of a horizontal ring 87, whereafter product 2 supports as according to FIG. 7 on inner fingers 88 of ring 87 which is then rotated according to arrows 89 by drive means (not shown).

As soon as the required horizontal rotation has been achieved the ring 87 is moved downward and product 2 is lowered again onto rollers 5. With these aligning means it is possible, subject to the camera 80, to present the apple bloom 91 and to align the apple (product 2) with its stalk 92 in the same direction as the stalks of all the other apples in the same box.

I claim:

1. A method for packaging an agricultural or horticultural product comprising the steps of:

recording images of the product;

comparing at least one of the recorded images with a reference image;

changing a position of the product until the comparison determines that the product is in an acceptable position; and packing the product in the acceptable position.

2. The method as claimed in claim 1, wherein at least one color camera records at least one image of the product.

3. The method as claimed in claim 2, further including distribution of the product to one of a plurality of handling locations, wherein the product is guided by guide means controlled by the at least one color camera.

4. The method of claim 2, further including the steps of distributing the product to one of a plurality of handling locations, and guiding the product by guide means controlled by the at least one color camera.

5. The method as claimed in claim 1, wherein at least one color camera is used to record recorded images of a plurality of sides of the product.

6. The method of claim 5, further including the steps of distributing the product to one of a plurality of handling locations, and guiding the product by guide means controlled by the at least one color camera.

7. The method of claim 5, wherein the product is packed in the acceptable position as a function of the comparison of the recorded images with the reference image.

8. The method of claim 7, further including the steps of distributing the product to one of a plurality of handling locations, and guiding the product by guide means controlled by the at least one color camera.

9. An apparatus for packaging an agricultural or horticultural product comprising:

at least one camera for making recorded images of the product;

comparing means for comparing at least one of the recorded images with a reference image;

handling means for changing a position of the product as a function of the comparison; and packaging means for packing the product in a selected position as a function of the comparison.

10. The apparatus as claimed in claim 9, further including guide means controlled by the at least one camera for distributing the product to one of a plurality of handling locations.

11. The apparatus as claimed in claim 9, wherein the at least one camera records recorded images of a plurality of sides of the product.

12. The apparatus of claim 11, further including guide means controlled by the at least one camera for distributing the product to one of a plurality of handling locations.

13. The apparatus as claimed in claim 9, wherein the at least one camera is a color camera.

14. The apparatus of claim 13, further including guide means controlled by the at least one camera for distributing the product to one of a plurality of handling locations.

* * * * *

UNITED STATES PATENT AND TRADEMARK OFFICE
CERTIFICATE OF CORRECTION

PATENT NO. : 5,737,901
DATED : April 14, 1998
INVENTOR(S) : Jacob Hendrik De Greef It is certified that error appears in the above-identified patent and that said Letters Patent is hereby corrected as shown below:

Column 2 Line 54 "bearings 42" should read --bearings 41--.

Column 3 Line 29 after "positions" insert --11,--.

Column 3 Line 40 "Empty boxes 72" should read --Empty boxes 12--.

Signed and Sealed this

Twenty-first Day of July, 1998

Attest:

BRUCE LEHMAN

Attesting Officer    Commissioner of Patents and Trademarks